United States Patent
Johnson et al.

(10) Patent No.: US 7,422,292 B2
(45) Date of Patent: Sep. 9, 2008

(54) ISOLATION SYSTEM FOR MOVABLE SAWS, INCLUDING A CONCRETE SAW

(75) Inventors: Adam Johnson, Olathe, KS (US); John Gibel, St. Joseph, MO (US)

(73) Assignee: Husqvarna Professional Outdoor Products Inc., Augusta, GA (US)

( * ) Notice: Subject to any disclaimer, the term of this patent is extended or adjusted under 35 U.S.C. 154(b) by 0 days.

(21) Appl. No.: 11/331,832

(22) Filed: Jan. 14, 2006

(65) Prior Publication Data

US 2007/0164598 A1      Jul. 19, 2007

(51) Int. Cl.
*B28D 1/04*      (2006.01)
(52) U.S. Cl. ................... 299/39.3; 125/13.03
(58) Field of Classification Search ............ 299/39.3; 125/13.03
See application file for complete search history.

(56) References Cited

U.S. PATENT DOCUMENTS

| | | | | |
|---|---|---|---|---|
| 2,189,780 | A | * | 2/1940 | Vitry ........................ 125/19 |
| 2,308,458 | A | * | 1/1943 | Saurer ...................... 248/605 |
| 2,673,725 | A | * | 3/1954 | Coates ..................... 299/39.3 |
| 2,700,256 | A | * | 1/1955 | Hurst ....................... 299/39.3 |
| 2,855,189 | A | * | 10/1958 | Lewis ...................... 299/39.3 |
| 3,664,228 | A | | 5/1972 | Hasz |
| 5,009,011 | A | | 4/1991 | Johansson |
| 5,046,890 | A | | 9/1991 | Dickson |
| 5,135,287 | A | * | 8/1992 | Karnes ..................... 299/39.3 |
| 5,269,355 | A | | 12/1993 | Bowen |
| 5,560,348 | A | | 10/1996 | Markley et al. |
| 5,680,854 | A | | 10/1997 | Kingsley et al. |
| 5,688,163 | A | | 11/1997 | Sidén |
| 5,690,391 | A | * | 11/1997 | Kingsley et al. .......... 299/39.3 |
| 5,749,353 | A | | 5/1998 | Markley et al. |
| 5,809,985 | A | | 9/1998 | Kingsley et al. |
| 5,810,448 | A | * | 9/1998 | Kingsley et al. .......... 299/39.3 |
| 6,286,905 | B1 | | 9/2001 | Kimura et al. |
| 6,470,874 | B1 | * | 10/2002 | Mertes ....................... 125/12 |
| 6,524,166 | B1 | | 2/2003 | Bergquist et al. |
| 6,855,039 | B2 | | 2/2005 | Vidmore |

(Continued)

FOREIGN PATENT DOCUMENTS

WO    WO 9302844 A1 *  2/1993
WO    WO2004069494       8/2004

OTHER PUBLICATIONS http://web.archive.org/web/20031015230026/www.fabreeka.com/tech/faqs_basicsvibration.pdf "Frequently Asked Questions About Vibration" published on or before 2003.*

(Continued)

*Primary Examiner*—John Kreck
(74) *Attorney, Agent, or Firm*—Henricks, Slavin & Holmes LLP

(57) ABSTRACT

A movable machine such as a concrete saw has an isolator or other damping element between the working tool portion of the machine and the supporting structure, such as a frame, chassis or other structure. The working tool portion of the machine may include a tool and a motor and the tool may include a support mounted or otherwise fixed to the motor.

49 Claims, 10 Drawing Sheets

U.S. PATENT DOCUMENTS

| | | | |
|---|---|---|---|
| 6,866,568 | B1 | 3/2005 | Liao |
| 2003/0196649 | A1 | 10/2003 | Vidmore |
| 2003/0205424 | A1* | 11/2003 | Felsing et al. ............... 180/242 |
| 2004/0003807 | A1 | 1/2004 | Hamilton |
| 2004/0031475 | A1 | 2/2004 | Markley |
| 2004/0159315 | A1 | 8/2004 | Howard et al. |
| 2006/0000464 | A1* | 1/2006 | Marques et al. .......... 125/13.01 |

OTHER PUBLICATIONS http://web.archive.org/web/20040502143958/http://fabreeka.com/tech/Primer_Vibr_Isol.pdf, "A Primer for Vibration Isolation" published on or before 2004.*

Diamant Boart Operating Instructions/Parts List for Portacut II Concrete/Asphalt Saws, 1982, Olathe, KS.

* cited by examiner

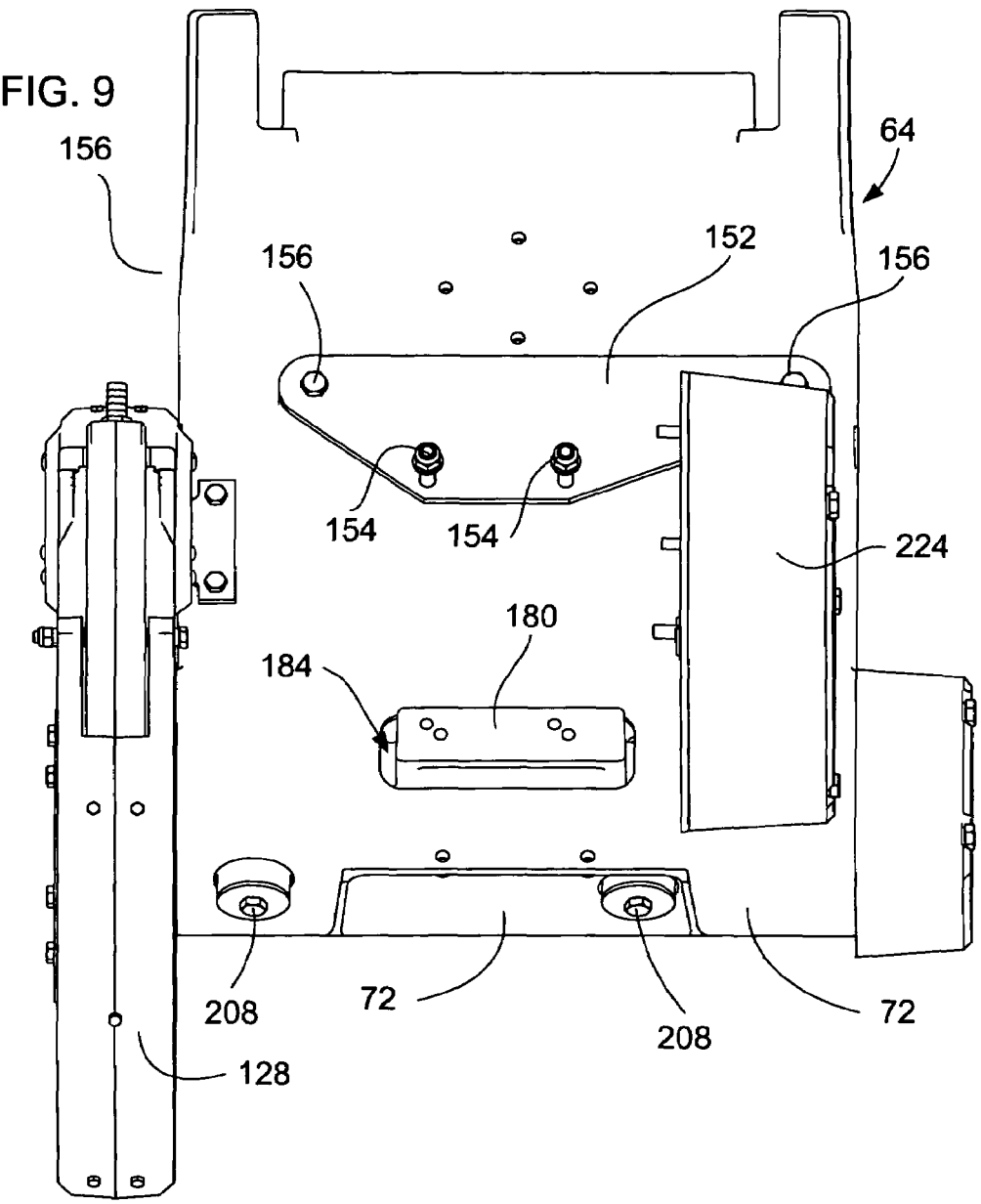

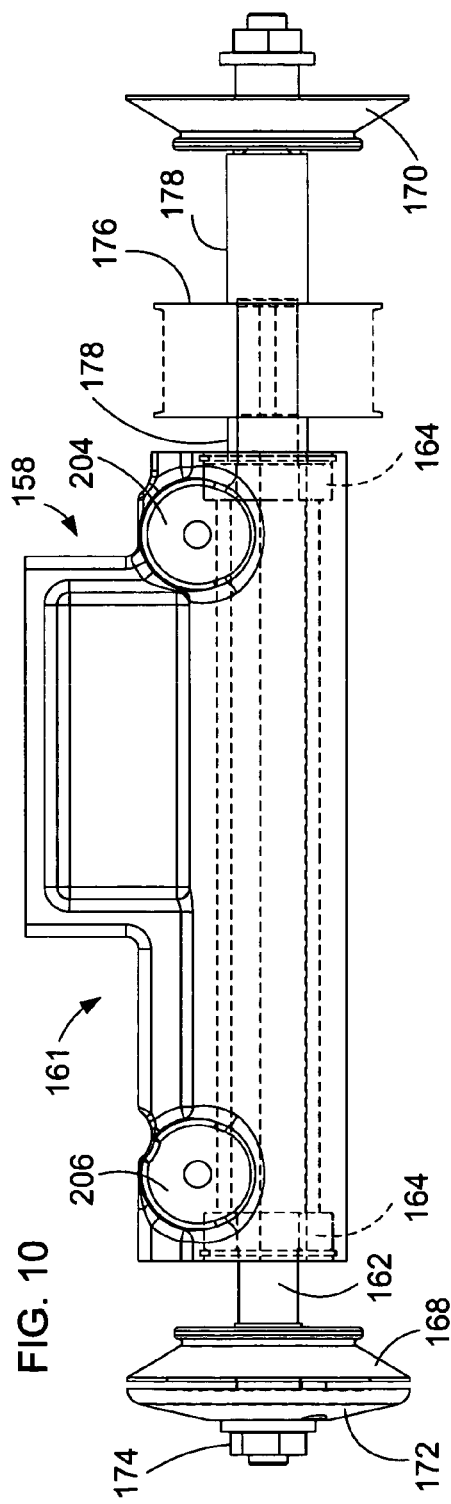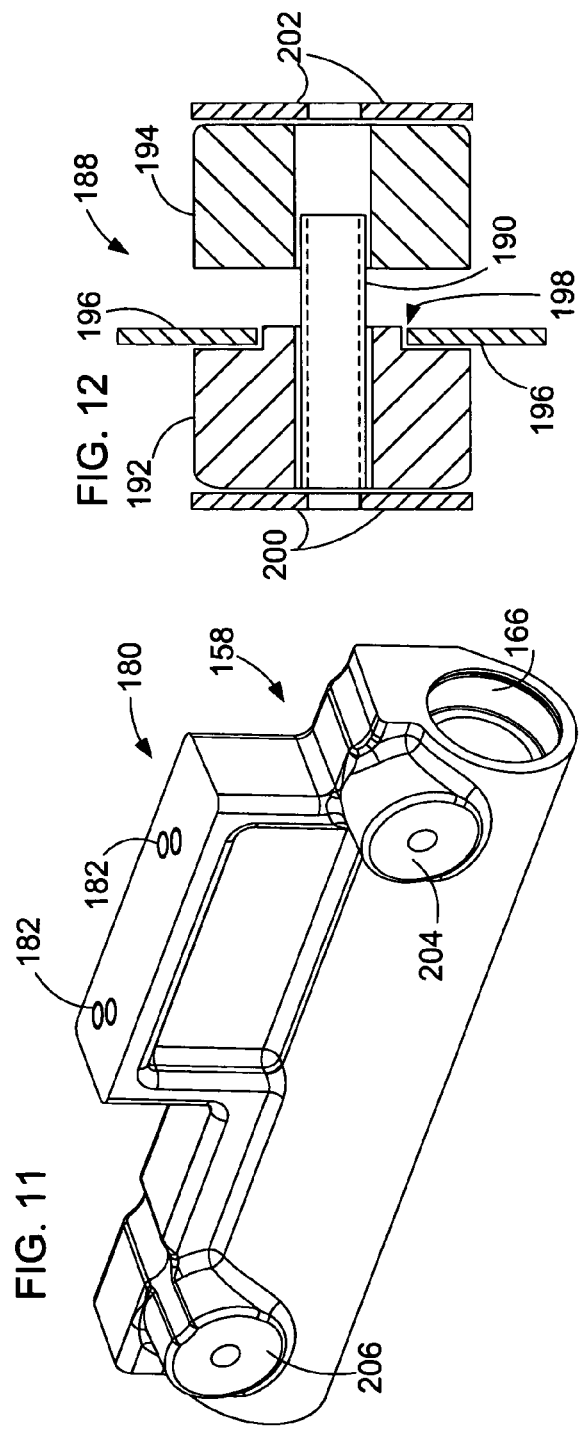

ISOLATION SYSTEM FOR MOVABLE SAWS, INCLUDING A CONCRETE SAW

BACKGROUND

1. Field

This relates to movable saws controlled by an operator, including concrete saws, portable motor-driven machining and finishing equipment, and the like.

2. Related Art

Movable saws are often motor operated, and the motor along with components driven by the motor produce vibration, noise and other secondary results along with the intended cutting or other results. This vibration, noise or other secondary results may be distracting, un-healthful, or may cause injury. For example, if an operator manually controls a saw, such as through handles mounted to the saw, vibration transmitted through the handles may over time produce operator fatigue, repetitive motion symptoms or other undesirable effects. While remote control may isolate the operator from the vibration and some of the other secondary results, remote control may often involve more complicated equipment that may limit how the machinery is used. Therefore, designs permitting remote control of the saw might not be desirable.

Vibration may also shorten the lifetime of components used in the saw. Therefore, overall lifetime may be shortened, or the cost of the saw may be higher, for example if one or more components are made larger, stronger or otherwise designed to better withstand the effects of the vibration. Higher costs may put the equipment beyond the reach of some purchasers, but part failure caused by fatigue may cause unacceptable downtime or higher operating costs.

SUMMARY

One or more examples of configuring machinery, for example concrete saws, described herein can reduce the amount of vibration and/or cyclical forces experienced by an operator, and may also reduce wear on components of the machine. Additionally, an operator's monitoring or observation of the work progress may also be improved. In some situations, reduced vibration in the machine may allow the operator to use the machine for a longer period of time.

In one example of a machine in which vibration and/or cyclical forces can be reduced, a movable machining device has a motor for driving a machine tool, for example a saw blade, and an isolator for isolating a frame portion of the movable machining device from vibrations produced through operation of the machine tool. Vibrations produced by the motor during operation can also be isolated from the frame portion. In one example, the motor can be an internal combustion engine, and in other examples the motor can be a hydraulic motor, an electric motor, air motor, or other motor suitable for converting any form of energy into mechanical energy, such as for turning a saw blade. Other components of the machining device can also be isolated from the frame portion. For example, the machine tool may be mounted to and supported by a shaft, for example a blade shaft, and the shaft can be isolated from the frame portion. In another example, the machine tool may be driven through one or more pulleys, and the one or more pulleys may be isolated from the frame portion. Additionally, where the machine tool is belt driven, a tensioning device can also be isolated from the frame portion. Furthermore, all moving parts between the motor and the machine tool can be isolated from the frame portion. Additionally, all the parts driven by the motor between the motor and machine tool can be isolated from the frame portion. Isolation of these components and parts helps to reduce vibration and/or cyclical forces experienced by the operator of the machine.

The terms "isolate," "isolation", "isolator," and other derivatives of "isolate" apply to structures and functions that reduce vibration and/or cyclical forces experienced by an operator when an isolator is used compared to that experienced by an operator when an isolator is not used. Isolation can be achieved by damping the vibration and/or cyclical forces at a location between the source of the vibration and the operator or other point of measurement. Damping can be achieved in a number of ways, including through use of materials, locations of components, and the like. Damping can occur through use of a cushion, pad or pillow positioned between the source of vibration and the operator or other point of measurement. Damping can be used to soften or suppress the transmission of the vibrations and/or cyclical forces between the source and any point of measurement. In other configurations, isolation can be achieved by separating, blocking or intercepting the vibrations and/or cyclical forces before they reach the point of measurement. For example, a shield can separate the source of vibration and/or cyclical forces from the point of measurement.

In another example, one or more driving and/or driven components between the motor and the machine tool are isolated from a frame element or other measurement point, for example a handle used by an operator. The driving and/or driven components may include a tool shaft, arbor, shaft housing, tool shaft assembly, drive components between the motor and the tool, such as a drive train. A drive train can take a number of configurations, including pulleys and belts and tension devices, gears, shafts, transmission elements, and the like. In one configuration, all components "up-drive" or upstream from the tool, for example a saw blade, including the motor, are isolated from the point of measurement.

Elements or components isolated from the vibration and/or cyclical forces may include a handle or other operator contact point, or elements that lead one way or another to a handle, support structures for other components or parts of the machine, frame elements, wheels, and the like. For example, a frame supporting a handle can be isolated from vibration, and a frame or chassis resting on wheels or other movement elements can also be isolated from vibration. Additionally, high-cost or more fragile components can be isolated from vibration in order to increase their useful life.

In a further example, a movable machine, for example a concrete saw, has a motor, namely a device that converts any form of energy into mechanical energy, and also has a drive element coupled to the motor for driving a tool. A first support allows the machine to move along a surface, and in one example the support may be a frame or other structure. An isolator is between the first support and the drive element, and in one example the isolator may be a damping element between a blade drive shaft and a frame element. In another example, a concrete saw with a motor includes a first frame or support element supporting the motor. A blade drive element is coupled to the motor and has means, for example a blade drive shaft, for accepting and supporting a concrete saw blade. A second frame element, for example a chassis having wheels, includes a support for allowing the concrete saw to move along the concrete. Rubber or thermoplastic damping elements are positioned between the blade drive shaft and the second frame element. Damping elements may also be positioned between the motor and the second frame element. Depending on the relative position and orientation of the motor and the blade drive shaft, the damping elements between the second frame element and the motor may be positioned and/or oriented differently from the damping elements between the second frame element and the blade drive shaft.

In an additional example, a concrete saw has a motor and a frame element having a support for allowing the concrete saw to move along a surface. A saw blade support is fixed to the motor and an isolator isolates the motor and/or the saw blade support from the frame element. The saw blade may be driven by the motor through a drive element such as a belt, gears, a chain or other drive mechanism or assembly. In a further example, the motor is supported on a second frame above the first frame element, and the second frame is isolated from the first frame element by an isolator. The isolator may extend between the first frame element and the second frame. The saw blade support may be fixed to the motor at a point above the first frame element. Additionally, the saw blade support may be supported behind a portion of the first frame element, for example where the first frame element includes a first platform portion extending under the motor and a flange element extending downward for supporting the saw blade support. The first frame element may be separated from the second frame by a plurality of isolators, and the saw blade support may be supported on the first frame element by another plurality of isolators. Where the motor is an engine with a drive shaft, and the saw blade support includes a blade drive shaft, the engine drive shaft may drive the blade drive shaft through a belt or other drive linkage.

In another example of a movable machine having a machine tool, a concrete saw includes a saw blade, motor and a drive assembly linking the motor to the saw blade. A support element supports the drive assembly and an isolator is positioned between the support element and the drive assembly wherein the drive assembly is supported only by one or more isolators. The isolator is preferably a damping element such as may be formed from rubber, Neoprene elastomer, or other thermoplastic materials. The isolator preferably includes at least one non-metal component and more preferably at least two non-metal components. Preferably, moving parts for driving the saw blade are isolated from the support element. For example, where the blade is driven through a belt, the belt, pulleys and sheaves, and a blade shaft are isolated from the support element. The moving parts are preferably isolated from the rest of the saw, for example from the handle, the wheels and the frame structure supporting the handle. In another example where the blade is driven through a hydraulic motor, the hydraulic motor, the drive assembly and the blade shaft are isolated from the rest of the saw. In an example where the blade is driven through one or more gears, the gears and the blade shaft are isolated from the rest of the saw. Other drive mechanisms may be used, and some or all of the components of those drive mechanisms may be isolated from the rest of the saw.

A further example has a concrete saw with a frame assembly having a support surface for supporting the saw on a concrete surface. A blade support element may be used to support a concrete cutting blade for a cutting operation. At least one damping element supports the blade support element and extends between the frame assembly and the blade support element. In one example, the support element is a blade shaft, and it may also include a blade shaft housing supporting the blade support element. The housing may include first and second support points wherein the at least one damping element has a first damping element at the first support point and a second damping element at the second support point. The saw can have a blade drive motor for driving the blade and the blade support element can be supported by the motor, including the situation where the blade support element is rotatably fixed to the motor. For example, the blade support element may be a blade shaft supported in a housing bolted to the motor. Additionally, a motor supported on the frame assembly can be supported through motor mounting damping elements. Such motor mounting damping elements can include first and second damping elements, and they may be spaced apart from each other, such as to distribute the support for the motor.

In another example of a concrete saw, a frame assembly supports the saw on a concrete surface. An engine is supported on the frame assembly. The saw includes a concrete saw blade support element and at least one damping element supporting the blade support element. A damping element also preferably supports the engine on the frame assembly. When the concrete saw blade support element is a blade shaft, the blade shaft is supported on at least one bearing assembly, which may be fixed relative to the engine. The at least one damping element supports the bearing assembly, and in an alternative, a plurality of damping elements support the bearing assembly. In the example of a plurality of damping elements, they are preferably spaced apart, and one or more of them may be oriented to extend to approximately perpendicular to the blade shaft. In another example of the plurality of damping elements, two damping elements may be oriented on respective axes, and the engine supported on the frame assembly through engine supports oriented in a first direction and wherein the respective axes of the damping elements extend in a second direction different from the first direction. In this example, damping elements may be oriented in different directions, for example to isolate vibrations or other cyclical motions from different orientations.

In an additional example of a concrete saw, a drive shaft on an engine drives a blade shaft spaced from the drive shaft. The blade shaft is supported by the engine. In this configuration, isolators can support the engine so that vibration and/or cyclical forces can be isolated from the rest of the saw. The blade shaft can be mounted to or otherwise supported by the engine, for example through bearings or other supports mounted to the engine that will allow the blade shaft to freely rotate. The blade need not be mounted to the engine drive shaft, and the blade shaft need not be coaxial with the engine drive shaft. Additionally, components of a drive train or drive assembly used to drive the blade shaft from the engine drive shaft can also be mounted or otherwise supported by the engine. For example, where the blade shaft is driven through a belt, the sheaves can also be supported by the engine, such as through their respective shafts, and any idler or tensioning component can also be mounted to or otherwise supported by the motor.

In several examples, moving or driving parts for driving a saw blade or other machine tool are supported on one side of an isolation assembly from other components on the other side of the isolation assembly, for example operator handle elements, controls and the like. One or more moving or rotating parts in the drive path between a motor and the machine tool driven by motor are isolated from one or more of the operator handle, a control console, frame elements, wheels and the like. Similarly, driving or driven components for driving the machine tool are isolated from other components such as handles, operator consoles, frame elements and the like. Isolation can occur through one or more isolation points, and in the example of motor driven concrete saw blades, two to four or more isolation points or isolation supports are provided. In one example described, the motor is supported by two isolation supports and the drive shaft supporting a saw blade is also supported by two isolation supports. More than four isolation supports can be used, and the number of isolation supports can be either an even number or an odd number of isolation supports.

These and other examples are set forth more fully below in conjunction with drawings, a brief description of which follows.

BRIEF DESCRIPTION OF THE DRAWINGS

FIG. 9 is a front upper view of a portion of the concrete saw of FIG. 2 showing configurations for supporting a motor and for supporting a blade shaft.

FIG. 10 is a front elevation view of a blade support assembly, including a blade shaft, bearing assembly and blade shaft housing.

FIG. 11 is an isometric view of the blade shaft housing of FIG. 10.

FIG. 12 is a partial transverse cross-section and exploded view of an isolator assembly with snubber washers and a schematic of a panel included to show environment.

DETAILED DESCRIPTION

Figure 1:
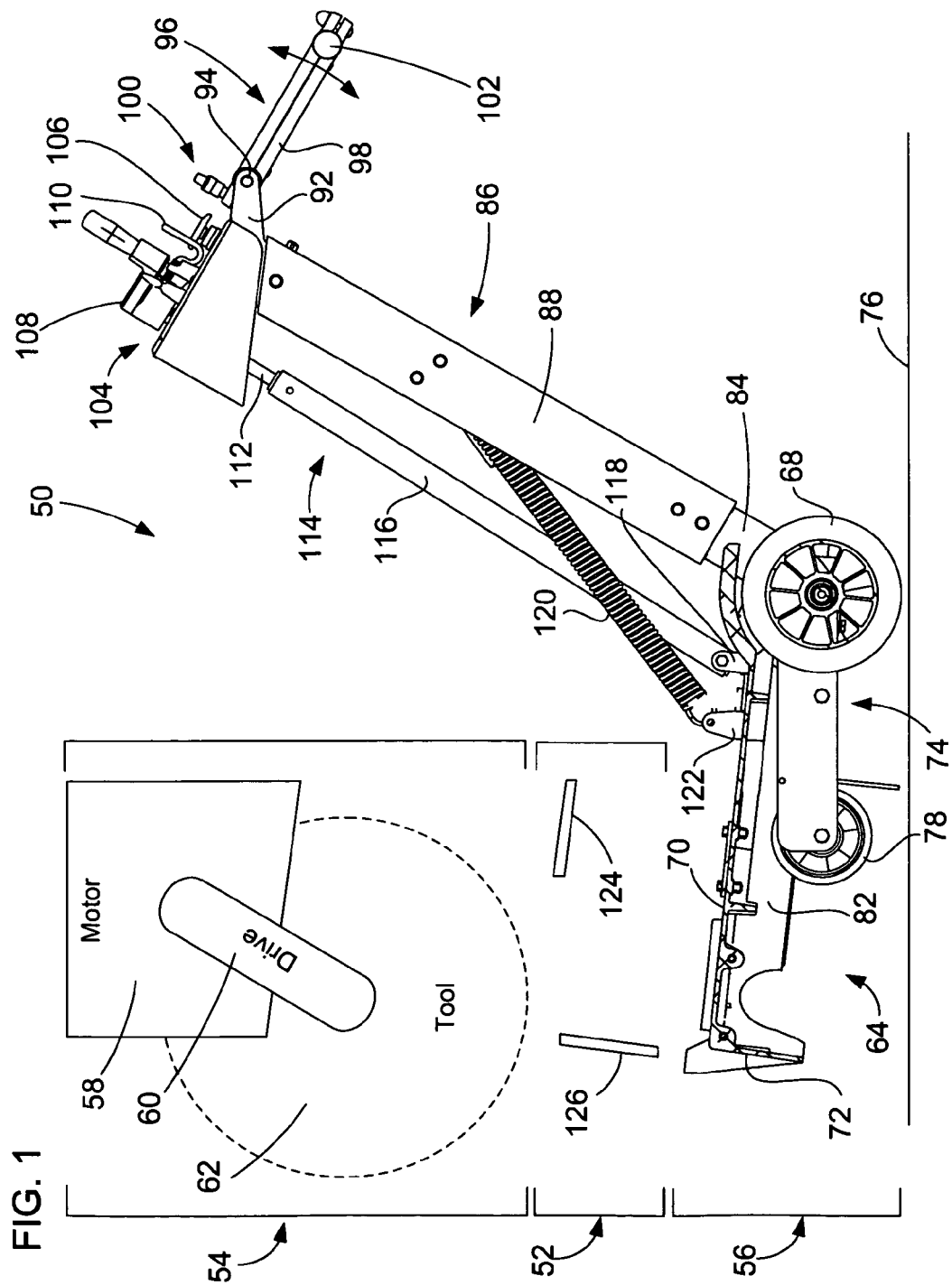
FIG. 1 is a side elevation, partial side section and partial schematic of a movable machine in the form of a concrete saw including an isolation system.

This specification taken in conjunction with the drawings sets forth examples of apparatus and methods incorporating one or more aspects of the present inventions in such a manner that any person skilled in the art can make and use the inventions. The examples provide the best modes contemplated for carrying out the inventions, although it should be understood that various modifications can be accomplished within the parameters of the present inventions.

Several examples of movable machinery, for example those having tools for cutting concrete, are described that can reduce the amount of vibration and/or cyclical forces experienced by an operator or measured at a given point on the machinery, such as at a handle. In one example, rotating or cyclical components or parts (or components such as motors containing parts moving in cycles) between a motor and a working tool, for example a saw blade, are isolated from a frame portion of the machine. Additionally, they are preferably isolated from the remaining portions of the machine supported by the frame, for example isolated from a handle, control console, and the like. As used herein, "motor" is defined as anything that converts any form of energy into mechanical energy. Additionally, a drive train of the machine is isolated from the frame in such a way as to reduce the amount of vibration at the handle of the machine.

These and other benefits will become more apparent with consideration of the description of the examples herein. However, it should be understood that not all of the benefits or features discussed with respect to a particular example must be incorporated into a tool, component or method in order to achieve one or more benefits contemplated by these examples. Additionally, it should be understood that features of the examples can be incorporated into a tool, component or method to achieve some measure of a given benefit even though the benefit may not be optimal compared to other possible configurations. For example, one or more benefits may not be optimized for a given configuration in order to achieve cost reductions, efficiencies or for other reasons known to the person settling on a particular product configuration or method.

Examples of a saw are described herein, with several configurations being described, and some configurations have particular benefits in being used together. However, even though these apparatus and methods are considered together at this point, there is no requirement that they be combined, used together, or that one component or method be used with any other component or method, or combination. Additionally, it will be understood that a given component or method could be combined with other structures or methods not expressly discussed herein while still achieving desirable results.

Concrete saws are used as examples of movable machines that can incorporate one or more of the features and derive some of the benefits described herein. Concrete saws often use motors to operate the blade, and may produce vibrations as a result. However, machines other than concrete saws can benefit from one or more of the present inventions.

In one example of a movable machine (FIG. 1), a portable saw 50 includes an isolation system 52. The saw also includes a working tool combination 54 supported on a frame combination 56. The working tool combination 54 in the examples described herein include a motor 58, a drive assembly 60 and a working tool in the form of a saw blade 62. Various aspects of examples of these combinations and of an isolation system are described in more detail herein, but an isolation system between a working tool and a frame helps to reduce vibrations experienced by an operator.

The motor 58 can take a number of configurations. In one configuration, the motor is an internal combustion engine with one or more pistons and other parts following cyclical motions. These parts produce noticeable vibrations or other cyclical forces in the machine, and these vibrations or forces may be disruptive to operators or may lead to shorter component lifetimes in the machine. In another configuration, the motor can be a hydraulic motor that also has moving parts that may produce vibration and/or cyclical forces, and it may be desirable to isolate these vibrations and/or cyclical forces from the rest of the equipment, such as the handle or control console, the frame or the like. The motor may also be an electric, air or other motor that may produce vibrations and/or other forces that may be isolated from the frame, handle and/or other components as desired.

The tool can also take a number of configurations. It can include saw blades, drilling or coring elements, grinding elements, machining elements, or other operating tools. In the present examples, the tool will be a concrete cutting blade 62.

The drive assembly 60 also takes a number of configurations. The configuration of the drive assembly may depend on the type of motor, the type of tool, or the configuration of the frame or other support for the working tool combination 54. The drive assembly will typically include in the present examples the components in the drive train from the motor output to the tool, and include the components driven by the motor output in order for the tool to work on whatever work piece is being operated on. In the present examples, the drive train does not include any components used to move the saw along a concrete surface. Conversely, the drive assembly in the present examples is intended to include reusable components for supporting the working or wearing portion of the tool to the extent they may be separable from the working or wearing portion of the tool. In the present examples, the drive assembly 60 includes a drive belt, tensioning element and blade drive shaft described more fully below.

Figure 2:
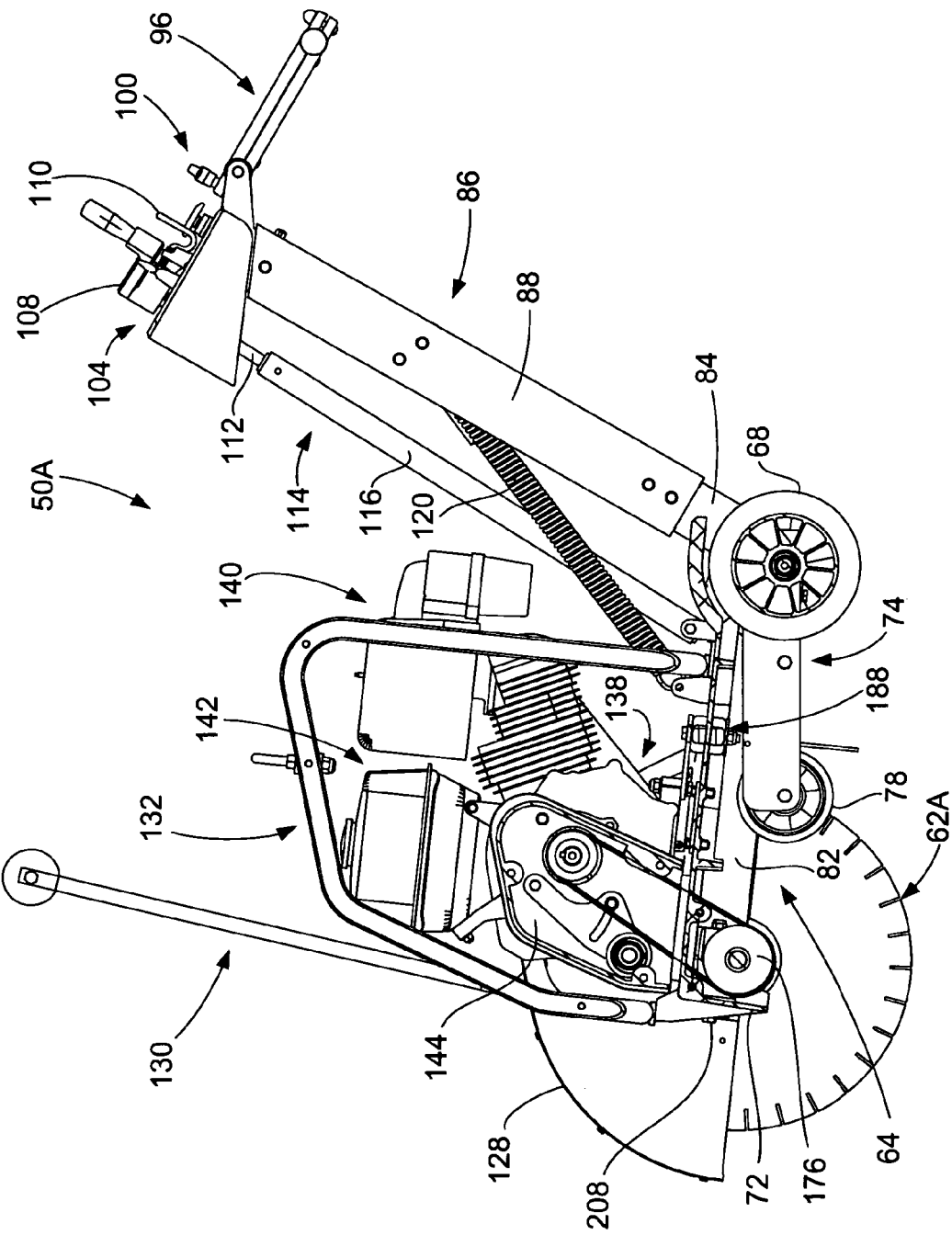
FIG. 2 is a side elevation view of a concrete saw incorporating an example of an isolation system.
Figure 3:
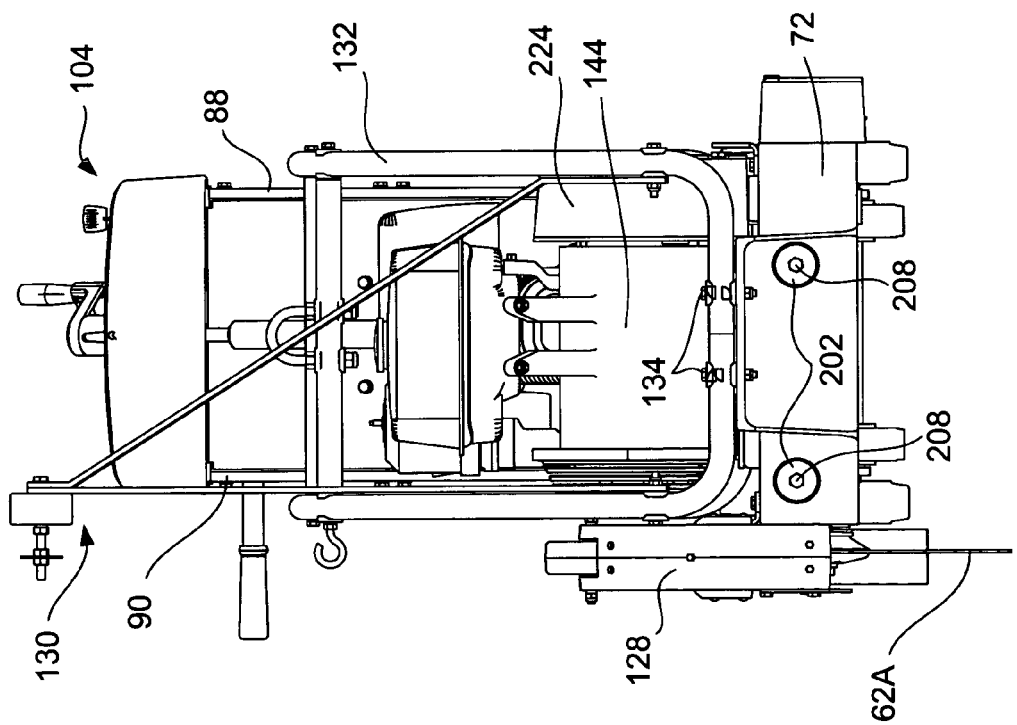
FIG. 3 is a front elevation view of the concrete saw of FIG. 2.

The frame combination 56 has a number of configurations, and those skilled in the art will appreciate that movable machines with which various parts of the present examples can be used are also numerous. In the example shown in FIGS. 1-9, the frame combination includes a first frame element 64, in this example an upper frame portion that supports the motor 58. The first frame element 64 may be considered an engine platform for the motor 58. The engine platform 64 in the present examples supports the motor 58, the drive assembly 60 and the tool 62. The engine platform 64 can have a number of shapes and sizes, and the configuration of the engine platform is preferably such as to reliably support the motor 58, the drive assembly 60 and the tool 62 during normal operation over the lifetime of the saw. The engine platform shown in FIGS. 1-3 is a cast part and includes reinforcing ridges or other surfaces for strength, mounting structures for various components, some of which are described herein, as well as openings 66 (FIG. 6) for receiving an axle assembly for the rear wheels 68 of the saw (FIGS. 1-2). Using a cast part may help to attenuate vibration sensed or measured at the handles or other measurement point. In the present example, the engine platform 64 pivots around the rear wheel axle, allowing the tool 62 in the form of the saw blade to be raised and lowered.

The engine platform 64 includes a generally though not exactly planar or plate portion 70 for supporting the motor 58 and other components which are attached to or supported by the engine platform. The engine platform 64 also includes a flange portion 72 extending downward from a forward portion of the plate portion 70, in this example, to help in supporting the drive assembly, and more specifically to help in supporting a blade shaft assembly, described more fully herein. The flange portion extends downward from and substantially perpendicular to the plate portion 70, and includes various structures for strength and/or for supporting components of the saw. The plate that is the flange portion may also extend at an angle different than 90 degrees and still adequately support the drive assembly or other part of the operating tool combination. If the blade shaft assembly were mounted to the front or other portion of the motor or to another support structure, for example, the flange can be modified or eliminated entirely.

The frame combination 56 also includes a second frame element, including in the present example a chassis or carriage assembly 74. The carriage assembly 74 is supported on a concrete surface 76 by the rear wheels 68, on the left and right sides of the carriage assembly 74, and by left and right front wheels 78, each of the front wheels being mounted on the inside surfaces of respective side walls of the carriage assembly 74. The front wheels and the respective side walls of the carriage assembly 74 are dimensioned so as to fit between corresponding left and right side walls 80 and 82, respectively, of the engine platform (FIGS. 1, 5-7). The terms "left" and "right" as well as "front" and "back" when used in the context of this saw example are used from the point of view of an operator standing behind the saw.

The carriage assembly 74 includes left and right posts 84 extending upwardly and rearwardly from the carriage assembly (FIGS. 1 and 2, only the left post 84 is shown). The posts 84 are fixed relative to, and may be integral with, the carriage assembly 74. The posts 84 receive and support a handle assembly 86 extending upwardly and rearwardly from the carriage assembly. The handle assembly in this example includes a left handle beam 88 and a right handle beam 90, fastened to and supported by respective ones of the left and right posts 84, so that the handle assembly is preferably fixed relative to the carriage assembly. As the handle assembly is moved, the carriage assembly is also moved. Additionally, with the engine platform 64 pivotally mounted about the rear wheel axle, the engine platform 64 and the parts supported by it can be moved through movement of the handle assembly relative to the ground 76. The handle assembly and the carriage assembly are relatively rigid structures with respect to each other so that the carriage assembly can reliably support the engine platform and any motor, drive and tool assembly, and so that the handle assembly can be used to conveniently move the saw during use, for storage or for transporting to or from a job site. While the frame combination 56 can take a number of configurations, the present examples have the engine platform 64 pivoting around an axis co-axial with the axle for the rear wheels 68 relative to the carriage assembly 74 and the handle assembly 86. The carriage assembly 74 and the handle assembly 86 are preferably fixed relative to each other so that raising and lowering the saw blade by raising and lowering the engine platform keeps the handle assembly at a relatively constant position for the operator. Other configurations can have the handle assembly mounted to the engine platform, one or more of the wheels supported independently on the engine platform, thereby changing the configuration for or eliminating the carriage assembly, as well as other configurations.

The handle assembly 86 includes a left side bracket 92 and an identical right side bracket (not shown) supporting between them a stationary handle bar 94. The stationary handle bar 94 in turn supports a T-shaped movable handle assembly 96 having a yoke 98 releasably pivotable about the stationary handle bar 94. The movable handle assembly 96 is also laterally adjustable along the stationary handle bar 94. The movable handle assembly 96 is releasably fixed to the stationary handle bar 94 through a releasable locking handle 100. The movable handle assembly 96 also includes a laterally adjustable handle bar 102 supported and releasably retained in the yoke 98 at a back-most or rear-most portion of the yoke 98. The movable handle assembly 96 is movable laterally and rotationally about the fixed handle bar 94, and the adjustable handle bar 102 is also movable laterally relative to the yoke 98. The movable handle assembly can be adjusted by the operator as desired, to make easier the operation of the saw.

The handle assembly 86 supports a control console 104 accessible to an operator for controlling various functions of the saw. The console may include an engine control 106, for example for turning off the engine, and a blade height control handle 108. The blade height control handle 108 can be locked in position using a handle locking pin 110 (FIGS. 1 and 2). The control console or other locations around the handle assembly can also include other components such as a water supply valve, and other components.

The blade height control handle 108 is fixed to an upper rotating portion 112 of a screw adjustment assembly 114. The screw adjustment assembly 114 adjusts the height of the blade through turning of the blade height adjustment handle 108. The upper rotating portion 112 includes a threaded portion engaging a complementary threaded portion on the inside of the stationary tube 116, so that threading the upper rotating portion 112 into or out of the stationary portion 116 changes the length of the screw adjustment assembly. The end of the stationary tube 116 opposite the upper rotating portion 112 is fixed to and supported by a mounting bracket 118, which in turn is mounted to and supported by the engine platform 70. Changing the length of the screw adjustment assembly raises or lowers the saw blade relative to the ground 76 by pivoting the engine platform 70 about the rear wheel axle relative to the carriage 74.

The frame combination 56 also includes a bias assembly in the form of one or more springs 120 for biasing the engine platform 70 upward toward the handle assembly 86. The springs 120 are mounted to respective brackets 122 fixed to and supported by the engine platform 70. The opposite ends of the springs 120 are mounted to an adjustable cross bracket extending between the left and right handle side beams 88 and 90. The lengths of the springs can be adjusted at the cross bracket so as to change the biasing force exerted on the engine platform 70. The springs make easier the raising and lowering of the saw blade through turning of the blade height adjustment handle 108.

The isolation system 52 (FIG. 1) can also take a number of configurations. The isolation system reduces significantly the magnitude and/or frequency of vibrations and/or other cyclical forces passing between the working tool combination 54 and the frame combination 56. Because the rotating and/or driving portions of the working tool combination 54 produce vibrations and/or cyclical forces that might be experienced by an operator during normal operation, the isolation system 52 preferably reduces the vibrations and/or other cyclical forces.

The isolation system can be a single isolating portion or can be multiple isolating portions either identical to each other or different from each other. In the present examples, the isolation system is made up of several identical assemblies, but at least one of which is oriented differently from the others. For example, a first isolation assembly is represented in FIG. 1 at 124 and a second isolation assembly is represented at 126. Each of the first and second isolation assemblies is preferably substantially identical to the other but have different orientations. In the schematic of FIG. 1, the first isolation assembly will isolate the working tool combination from the rest of the saw by mounting between the motor 58 and the engine platform. The second isolation assembly will isolate the working tool combination from the saw by mounting between the drive assembly and the flange portion 72 of the first frame element. In other configurations, the first and second isolation assemblies can be merged into each other, can have the same orientation, or take a number of other configurations. The portions of the isolation system can each be made of the same materials, or they may be formed from different materials as between one portion and another. In the present examples, each portion serving to isolate vibrations is formed as an assembly from several different components and each assembly is substantially identical to the others.

The isolation system can achieve isolation of the frame combination from the working tool combination through a number of means or modes. For example, an isolating portion can be a damping element that reduces vibrations and/or cyclical forces experienced at one or more measuring points on the frame combination. One example of a measuring point would be the handles where the operator may be able to sense vibrations. In the present examples, the damping element preferably reduces the vibrations and/or cyclical forces to a level that is lower than if the damping element was not used. The damping element is preferably configured to have a sufficient amount of damping-quality material to measurably reduce the vibrations and/or cyclical forces (sometimes referred to hereinafter collectively as vibrations) at the desired measurement point. For example, an isolation system according to the present examples can reduce the measured acceleration (vibration and/or cyclical forces) greater than about ½ to ¼ of what they were without the isolation system. While a reduction in measured acceleration of only five or 10 percent may be significant, greater reductions in measured acceleration may be desirable if they can be achieved. For example, vibrations at the handle of around 2-5 meters/second$^2$ may be acceptable in some situations.

Some forms of isolation systems may use cushions, pads or pillows to muffle, soften or suppress vibrations. Additionally, a form of isolation system can also include a spring and damper system or combination, or equivalents thereof. A number of materials that can be used for isolation include rubber or Neoprene materials, foams, gels and similar materials. Those skilled in the art will be able to identify suitable materials for an isolation system such as that used on the concrete saws of the present examples, or suitable for isolation systems for other movable machinery. In the present examples, Neoprene elastomers are used and they may have durometers between 25 and 60, and in one example of a configuration described herein, the durometer may be between 35 and 45.

The isolation system 52 is preferably positioned in such a way as to isolate rotating or cyclical moving parts used to drive the saw blade from the frame combination, including the handle and other structures that might be used by an operator. The isolated components are preferably those that are driving components used to drive the saw blade. Such components either inherently develop vibrations or have vibrations produced in them in reaction to operation of the saw blade on the work piece. For example, the isolation system preferably isolates the motor 58, the drive assembly 60 and the saw blade 62 from the frame combination. Additionally, the isolation system 52 isolates the working tool combination as a unit, which more effectively isolates the vibrations from the rest of the saw. Moreover, configuring the various components of the working tool combination as a unit, such as by interconnection or by fastening them together, makes easier the isolation of the vibrations from the rest of the saw. The isolation system also preferably isolates the working tool combination 54 from components to extend their operating life. In the examples described, the working tool combination is isolated from such components as the handle assembly, the frame and carriage and wheels and the other support structure.

Figure 4:
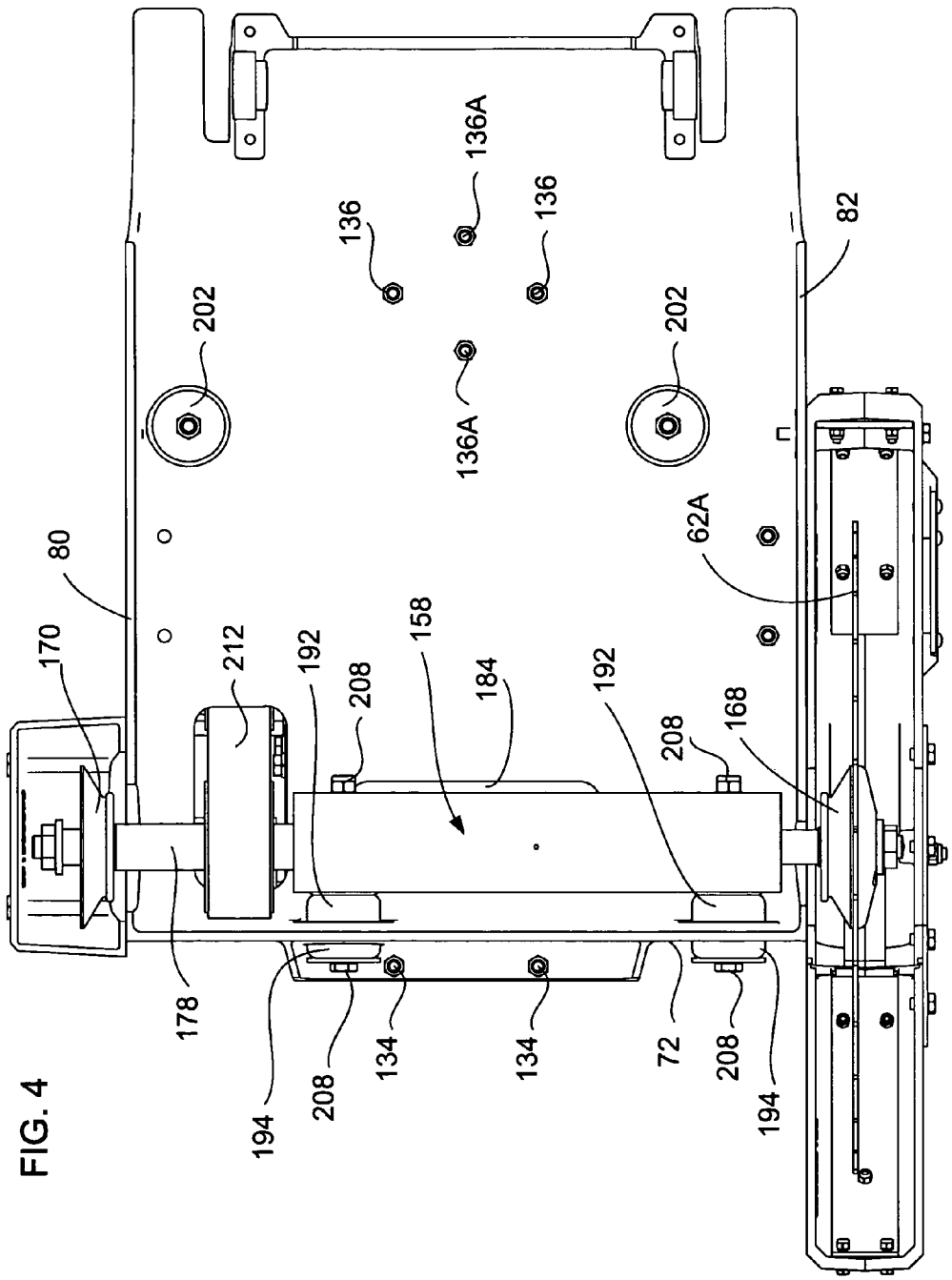
FIG. 4 is a bottom plan view of the saw of FIG. 2.

Considering the example of the saw 50 in more detail, some additional components of the saw may be seen in FIGS. 2-5, where the saw 50A is conceptually the same as the saw 50 in FIG. 1 and identical components have identical reference numerals. The saw 50A includes a blade guard 128 for covering a portion of the blade 62A. A marker assembly 130 is pivotally mounted to and supported by a lifting cage 132. The lifting cage is reliably fixed to and supported by the engine platform through fasteners 134 (FIGS. 3-4) and 136 (FIG. 4). The fasteners 136 and 136A may also help to hold and secure the brackets 118 and 122 (FIG. 1) to hold the screw assembly and the springs in place.

Figure 5:
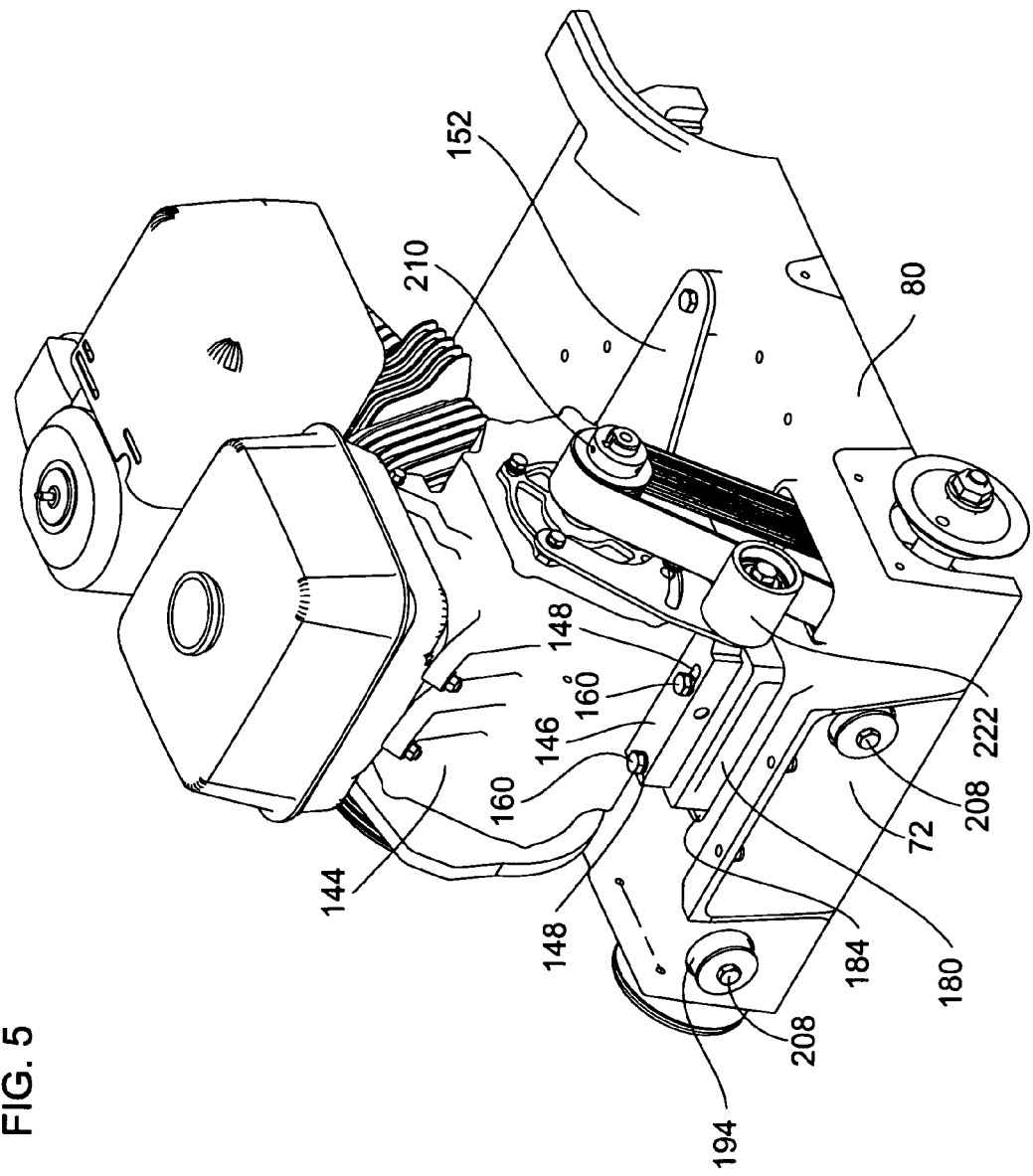
FIG. 5 is an isometric view of a portion of the saw of FIG. 2.
Figure 6:
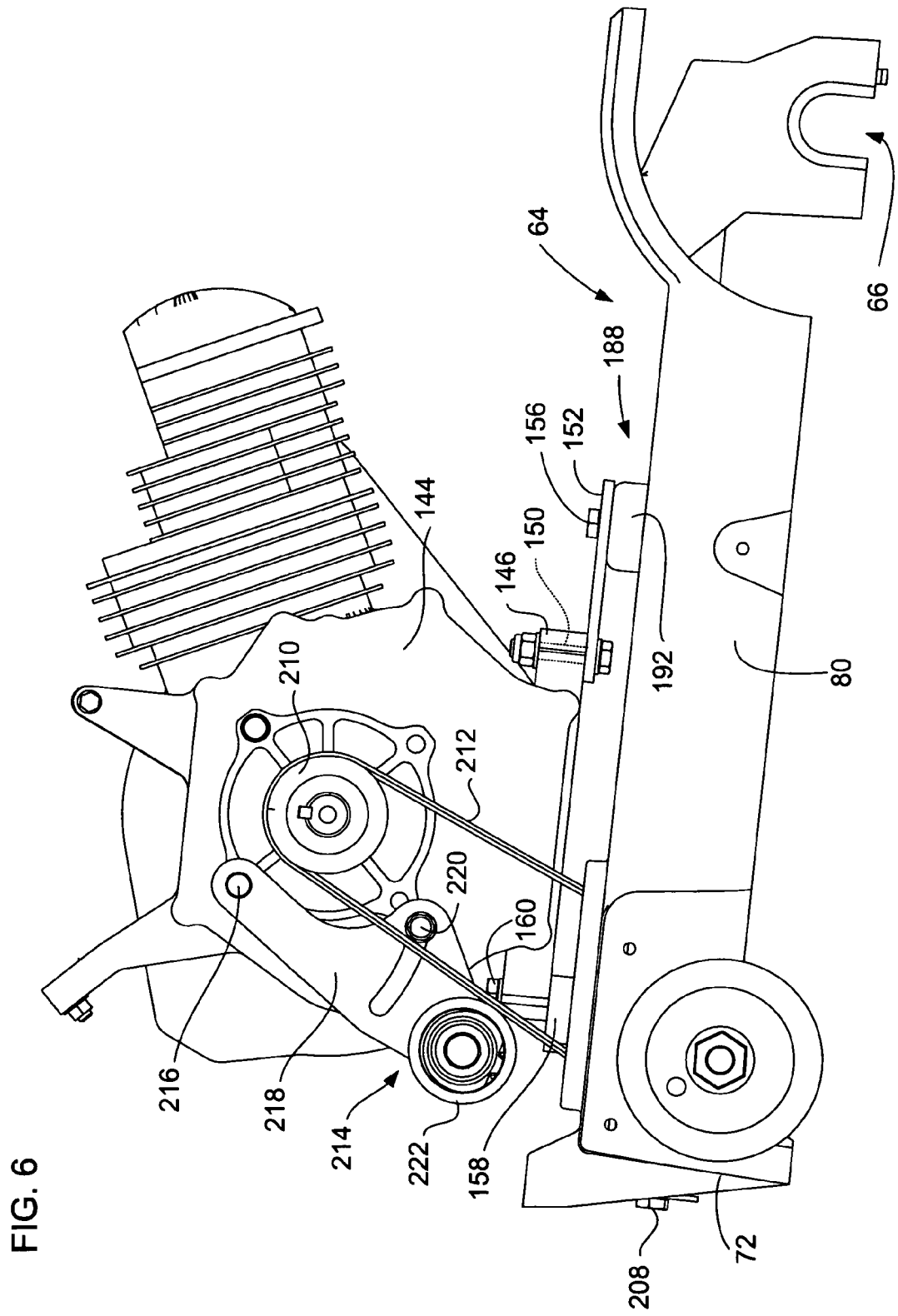
FIG. 6 is a side elevation view of a portion of the saw of FIG. 2.

The saw 50A in this example includes an internal combustion engine 138 having a conventional exhaust system 140 and also supporting a water supply tank 142. The engine includes an engine block 144 having a mounting base 146 (FIGS. 5-6) for suitable attachment to a support. In the present example, the mounting base 146 includes two spaced apart mounting holes 148 in the front of the engine 138 (FIG. 5) and two spaced apart mounting holes 150 at the rear of the engine, one of which is shown in FIG. 6. These mounting holes are used to support the engine.

At the rear of the engine, the engine is supported by a trapezoid-shaped support element in the form of a support plate 152 (FIGS. 5-6 and 9) having mounting holes complementary to the rear mounting holes 150 for receiving suitable fasteners 154 (FIG. 9). The fasteners 154 are spaced apart from each other at the front part of the plate 152. At the rear part of the plate 152, spaced apart fasteners 156 (FIGS. 6 and 9) support the plate 152 and therefore help to support the engine 138 on the engine platform 64 through respective isolator assemblies, described more fully below. Other support arrangements can be used to support the engine, as well. For example, a single mounting point can be used for this portion of the engine block or more than two. Additionally, a single mounting point can be used for that portion of the plate supported by the engine platform, but two or more are preferred. Additionally, a smaller support plate 152 can be used, or one having a different shape, but a relatively wide distributed load is preferred.

Figure 7:
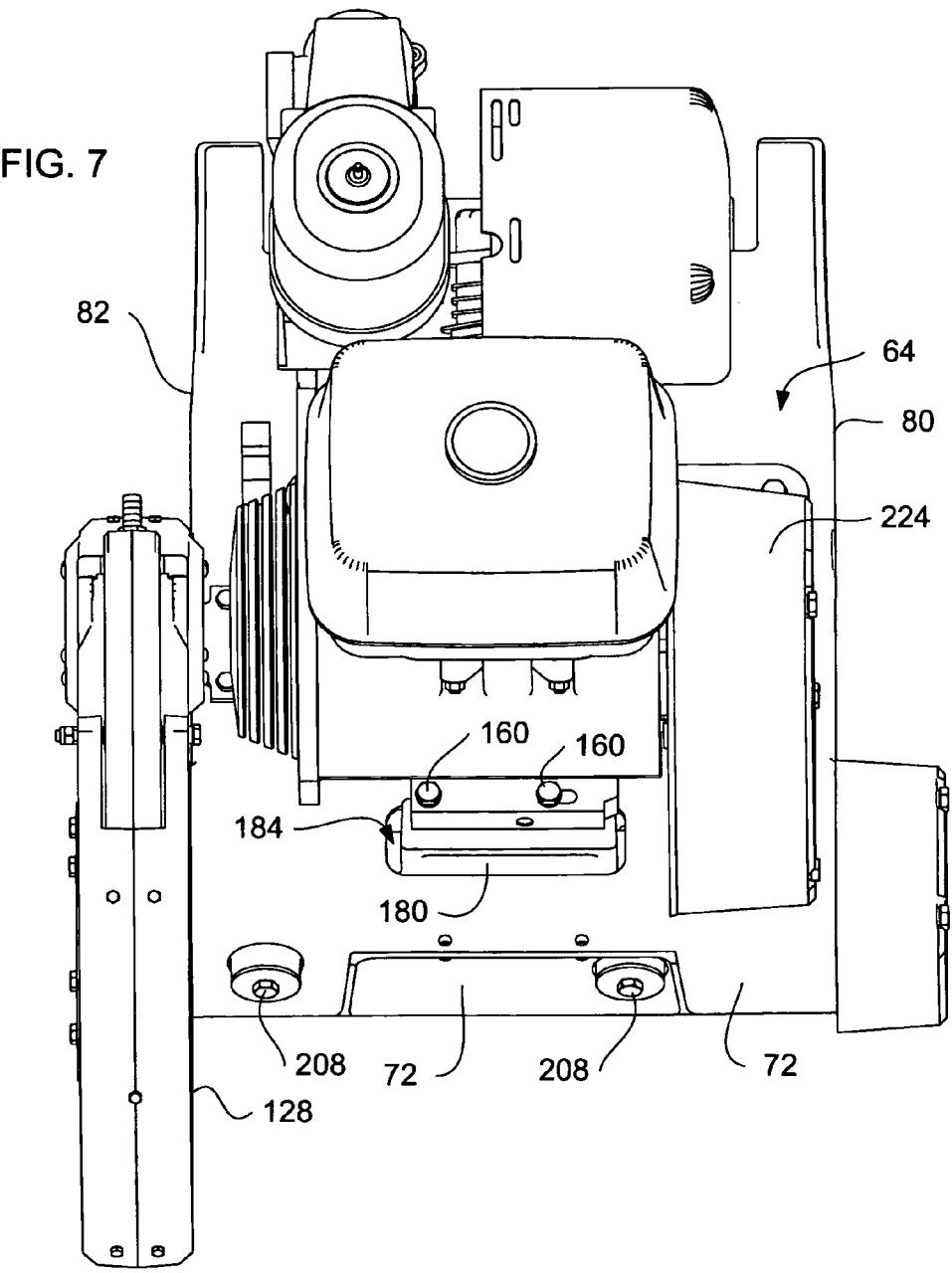
FIG. 7 is an upper front view of a portion of the saw of FIG. 2.

At the front of the engine 138, the engine is supported by the flange portion 72 of the engine platform through isolator assemblies, described more fully below, and through a blade shaft housing, also described more fully below. Specifically, the mounting base 146 at the front of the engine is rigidly mounted to a rigid blade shaft housing 158 (see also FIGS. 10 and 11) through corresponding bolts 160 (FIGS. 5-7). The bolts 160 are preferably spaced apart so as to more widely distribute any loading applied by the engine. Mounting the engine to the blade shaft housing contributes to making the moving and/or driven parts, such as the engine, blade shaft assembly and blade, a relatively more unitary structure, which makes easier the isolation of the vibrations associated with those moving and/or driven components of the unitary structure. Mounting the blade shaft support to the engine helps to form those rotating and/or driven components into a more unitary structure. In other examples, for example where the blade shaft is supported by pillow block bearings, the pillow block bearings can be mounted to the engine. Other configurations can be used for making the blade shaft and the engine a relatively more unitary structure. In this example, the engine is supported by the flange portion 72 of the engine platform through the rigid attachment of the blade shaft housing to the engine mounting base 146.

Considering the blade shaft assembly in more detail with respect to FIGS. 10-11, the blade shaft assembly 161 in the present example includes a blade shaft housing 158 supporting the blade shaft 162 through a pair of bearings 164 set into or retained in recesses 166, one of which is shown in FIG. 11. The blade shaft includes a right inner blade flange 168 against which a blade is mounted when on the right side of the saw, and a left inner blade flange 170 against which a blade is mounted when on a left side of the saw. An outer blade flange 172 is used to hold the blade in place against the corresponding inner blade flange with the nut 174. The blade shaft assembly also includes a sheave 176 rotatably securely mounted in this example at a left portion of the blade shaft for receiving one or more belts from the engine for driving the blade shaft. The sheave 176 includes one or more grooves represented by the dashed lines for reliably engaging the belt or belts. The sheave may be positioned laterally on the blade shaft by one or more spacers 178. The sheave, blade shaft and blade flanges are rotating, cyclically moving or driven components that may produce or transmit vibrations in the equipment. Additional information about blade shaft assemblies can also be found in U.S. Pat. No. 5,680,854, the disclosure of which is incorporated herein by reference.

The blade shaft housing 158 includes a mounting part in the form of a post, projection, riser, or boss 180. The post 180 supports the engine on the top surface of the post through the fasteners 160 extending into a pair of the openings 182 in the post 180. The post 180 extends upward substantially perpendicular to the planar surface of the engine platform 70. As shown in FIGS. 4-5, 7 and 9, the engine platform 64 includes an opening 184 in the front portion of the engine platform 70 sufficiently large to accommodate the post 180 and any lateral or forward or backward movement that might occur in the post relative to the engine platform during normal operation. In the present example, the upper surface of the post 180 extends above the engine platform 70, and the engine mounting base 146 rests on the post 180 at a level above the engine platform. Therefore, any vertical movement of the engine relative to the engine platform preferably minimizes contact between the engine and the engine platform. The engine and the other components rigidly connected to the engine are preferably supported at locations spaced sufficiently apart from the engine platform so as to minimize contact with the engine platform during normal operation.

Figure 8:
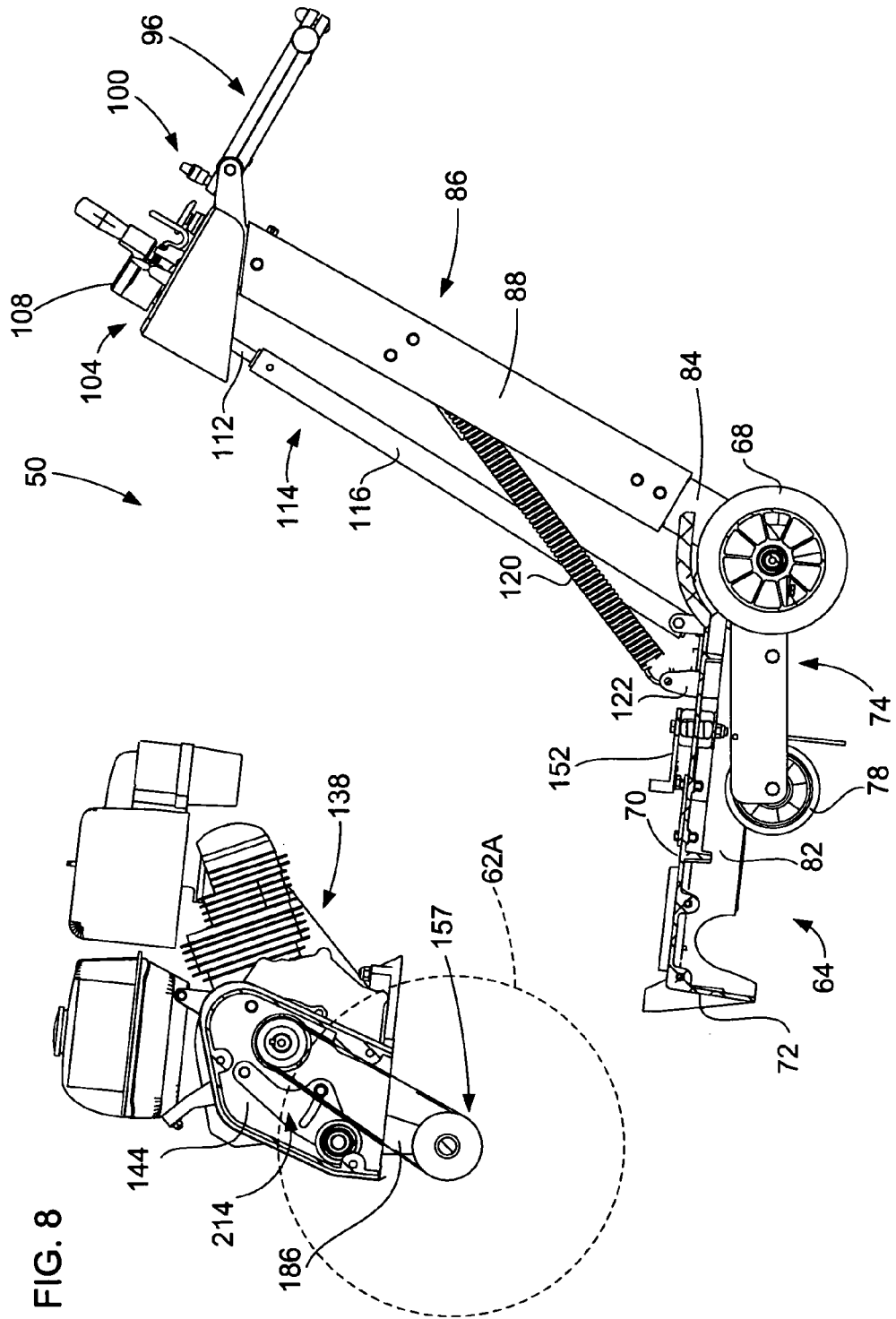
FIG. 8 is a side elevation of an exploded and partial schematic of a concrete saw such as that shown in FIG. 2.

With the engine and the blade shaft assembly and blade mounted together, those components operate as a working combination and a substantially unitary structure. As such, they can be supported by a frame structure such as the engine platform or other frame structure through an isolator assembly to more easily isolate vibrations from the working combination relative to the frame structure. For example, as shown in FIG. 8, the motor 138, blade shaft assembly 161 and the saw blade 62A can be supported as a unit through the isolation system on a frame or other support. As depicted in FIG. 8, the saw blade 62A is mounted to and supported by the blade shaft assembly 161. The blade shaft assembly 161 and blade 62A combination is rigidly fixed to the engine 138 through one or more mounting elements 186 in such a way as to still allow the blade to rotate freely with the blade shaft. As described above, the mounting elements may take the form of the post 180 in combination with a blade shaft housing 158 to rigidly fix the blade shaft assembly and the engine together while still allowing the blade and blade shaft to rotate as driven by the engine. It is noted that the post of the blade shaft housing 158 and the plate 152 can be considered a frame for supporting the engine on the isolators. In another configuration previously mentioned, the mounting elements may take the form of pillow block bearings rotatably supporting the blade shaft while being mounted to the engine block. Other configurations of an engine, blade shaft assembly and blade may also be used and may operate as a unit or a sub unit to permit more effective isolation of vibrations from the remainder of the saw. While these components including the engine, blade shaft assembly and blade do not need to be mounted together, their common mounting arrangement makes easier their support by a frame structure or other support structure, and also makes easier their isolation from other components. For example, the number and/or configuration of isolators for the components may be reduced or simplified. However, it should be understood that one or more of these components can be separately isolated from a frame structure or other support structure and still achieve one or more the benefits of these examples.

It is noted that the engine 138, blade shaft assembly 161 and blade 62A can be treated as a unit even though they are not assembled as a unit before any of the parts of the unit are mounted on the engine platform. For example, the blade 62A is typically not on the blade shaft until the saw is ready to be used or tested, rather than before shipment. Additionally, because of the configuration of the engine platform, the engine 138 is positioned above the engine platform and the blade shaft assembly is positioned below the engine platform before the engine and blade shaft assembly are fastened to each other. Once they are properly positioned, they can be fastened to each other and the engine block can be fastened to the plate 152 and the blade shaft assembly mounted to the flange portion 72 through the corresponding isolators. In this configuration, the engine is supported on the blade shaft assembly 161, and together they are supported on the flange portion 72 through the corresponding isolators.

In the examples shown in FIGS. 2-9, the isolation assemblies 124 and 126 of FIG. 1 are provided by two pair of isolator assemblies, one isolator assembly of a pair being shown in a partially exploded configuration at 188 around a support plate in FIG. 12. Isolator assembly 188 can be a conventional damping or vibration absorbing component such as those available from Moore Rubber Company, Part No. MRC145, or EBCO, Inc., of Elk Grove Village, Ill. The configuration of any given isolator assembly may depend on the magnitude and direction of the vibration or forces experienced by the assembly, the size, shape and other configuration details of the surrounding structure, and the like. In the present examples that may be appropriate for a concrete saw with a motor that may be in the range of 8 to 15 horsepower and an overall saw weight from 200 to 300 pounds, the isolator assembly 188 can have the configuration shown in FIG. 12.

The isolator 188 includes a strong rigid tube 190 for receiving a fastener such as a bolt, for example bolts 156 in FIG. 6. The tube 190 may be a steel tube, for example a 1010-1020 steel tube. The isolator assembly 188 in the present example includes a first isolator element 192 and a second isolator element 194, each having preferably central openings for receiving the tube 190. In the present example, the first and second isolator elements are substantially circular in transverse cross-section, and together form a substantially solid cylinder with a central opening for receiving the tube 190. A portion of the material of the facing surfaces of one or both of the isolator elements is removed or recessed so that the two isolator elements sandwich between them the plate, panel, tab or other structure 196 on which the isolator assembly 188 is mounted. Typically, a round or other suitable opening 198 is formed in the panel 196 to receive a portion of the isolator element. The isolator assembly 188 is supported within the opening by the surrounding panel structure, and the isolator elements 192 and 194 isolate the panel 196 and the surrounding structure from vibrations that may be received through the bolt from the adjacent part of the working tool combination.

As shown in FIG. 12, the isolator element 188 is sandwiched by pressure plates or snubber washers 200 and 202 to partially compress the isolator elements. One of the pressure plates may be a conventional washer while the other pressure plate is typically part of the structure experiencing the vibrations to be isolated from the panel 196. However, it should be understood that other mounting configurations for the isolator elements can be used.

Considering one application of each isolator assembly 188 in the saw of the present examples, two isolator assemblies 188 are used to support the blade shaft housing 158 on the flange portion 72 of the engine platform. The blade shaft housing includes at least two support points or isolator assembly mounting surfaces 204 and 206 which serve as the pressure plate 200 against the respective isolator assembly 188 (FIGS. 10 and 11). The surfaces 204 and 206 are preferably as close to the outer ends of the housing as possible, to spread out the loading on the housing, and therefore on the flange portion 72. The blade shaft housing 158, and therefore the blade shaft assembly 161, is held in place with the isolator assemblies 188 to the flange portion 72 through respective fasteners 208 (FIGS. 2-7 and 9). In this configuration, material of the flange portion 72 surrounding respective openings in the flange portion take the place of the panel 196 shown in FIG. 12. Because the isolator elements 192 and 194 when assembled have a greater length than the tube 190, the pressure applied by the fasteners 208 through the mounting surfaces 204 and 206 and the opposite pressure plates 200 pre-compress the isolator elements 192 and 194 until their combined length is approximately the same as the length of the tube 190. In this configuration, the working tool combination of the blade shaft assembly, blade and engine are supported in part by the flange portion 72, and vibrations from the tool combination are isolated at least in part by the pair of isolator assemblies 188 between the blade shaft housing 158 and the flange portion 72. In an alternative configuration, the blade shaft can be a more integral part of the engine block and the front or other parts of the engine block can be mounted to the engine platform through the forward isolator assemblies.

In another application of each isolator assembly 188, two isolator assemblies 188 are used to support the engine 138 (FIGS. 2 and 6) by supporting the plate 152 on the engine platform 64. In this configuration, the plate 152 replaces the pressure plate 200 on each of the isolator assemblies 188 in the pair. While the plate 152 is not a moving or driven part of the working tool combination, it is effectively part of the combination by supporting the engine block. The isolator elements 192 and 194 in each assembly of the pair sandwich the material around a corresponding opening in the upper portion of the engine platform. The material of the engine platform takes the place of the panel 196 shown in FIG. 12. The fasteners 156 (FIG. 9) hold each of the isolator assemblies in place so that the plate 152 can be supported by the engine platform and so that vibrations transmitted from the engine into the plate 152 are insulated or isolated from the engine platform. Through the plate 152, the engine and other moving or driven components are support in part by the engine platform, and vibrations coming from those parts are insulated at least in part by the isolator assemblies supporting the plate 152. As shown in FIG. 9, the isolator assemblies secured in place by the bolts 156 are spaced apart to more widely distribute the load from the engine. The spacing of the fasteners 156 is greater than the spacing of the fasteners 154 holding the engine onto the plate 152, and preferably at least twice the spacing.

Placement of other components on the saw may also help to isolate the framing combination from vibrations. In the present examples, the drive train is formed by an engine pulley 210 (FIGS. 2 and 5-6), a drive belt 212, and the blade shaft pulley 176. In the present examples, these components are all part of the working tool combination. In the present examples using a belt drive, a tensioning element or idler sheave 214 is also mounted to the engine block 144 through a pivot bolt 216 allowing an idler arm 218 to be adjusted relative to the engine block. A locking bolt 220 locks the idler sheave in the desired position so that the sheave 222 applies the proper tension to the belt 212. The idler sheave 214 is preferably mounted above the engine platform, on the same side of the platform as the engine 138, and the belt 212 passes through an opening in the engine platform to the blade shaft pulley below the engine platform. Mounting the idler sheave (and/or other moving or driven parts) to the engine block or another part of the working tool combination helps to keep the moving and/or driven parts as a substantially unitary assembly. The drive train can be covered by a belt cover 224 (FIG. 7) also mounted to the engine block.

Having thus described several exemplary implementations, it will be apparent that various alterations and modifi- cations can be made without departing from the concepts discussed herein. Such alterations and modifications, though not expressly described above, are nonetheless intended and implied to be within the spirit and scope of the inventions. Accordingly, the foregoing description is intended to be illustrative only.

What is claimed is:

1. A concrete saw comprising:
a motor and a first support element supporting the motor, and a blade drive element coupled to the motor and having means for accepting and supporting a concrete saw blade;
a second frame element wherein the second frame element includes a support having at least one wheel oriented so as to allow moving the second frame element in the direction of cutting by the concrete saw blade for allowing the concrete saw to move along a surface; and
a damping element extending between the blade drive element and the second frame element.

2. The saw of claim 1 wherein the damping element is a first damping element and further including a second damping element between the first support element and the second frame element.

3. A concrete saw comprising:
a motor and a first support element supporting the motor, and a blade drive element coupled to the motor and having means for accepting and supporting a concrete saw blade;
a second frame element wherein the second frame element includes a support for allowing the concrete saw to move along a surface; and
a first damping element between the blade drive element and the second frame element and a second damping element between the first support element and the second frame element and wherein the first and second damping elements are oriented at angles with respect to each other.

4. The saw of claim 1 wherein the blade drive element is fixed to the motor.

5. The saw of claim 1 wherein the motor and a blade drive element are coupled through a drive belt.

6. The saw of claim 1 wherein the motor and a first frame are supported above the second frame by at least the damping element.

7. The saw of claim 6 wherein the blade drive element is fixed to the motor at a point above the second frame for rotation.

8. A concrete saw comprising:
a motor and a first support element supporting the motor, and a blade drive element coupled to the motor and having means for accepting and supporting a concrete saw blade;
a second frame element wherein the second frame element includes a support for allowing the concrete saw to move along a surface;
a damping element between the blade drive element and the second frame element;
wherein the motor and a first frame are supported above the second frame by at least the damping element and wherein the blade drive element is fixed to the motor at a point above the second frame for rotation; and
wherein the damping element is a first damping element and wherein the blade drive element is supported by a second damping element below the point where the blade drive element is fixed.

9. The saw of claim 8 wherein the motor is supported above the second frame, and wherein the blade drive element is supported behind a portion of the second frame.

10. The saw of claim 9 wherein the motor is supported on a first portion of the second frame and wherein the blade drive element is supported on a second frame portion extending substantially perpendicular to the first frame portion.

11. The saw of claim 8 wherein the blade drive element is supported by two spaced apart damping elements and the motor is supported by two spaced apart damping elements.

12. The saw of claim 8 wherein the first support element is a plate between the motor and the second frame element.

13. The saw of claim 12 wherein the motor is fixed to a portion of the plate and the damping element supports the plate at a second portion spaced from the first portion of the plate.

14. The saw of claim 13 wherein the first plate portion is narrower than the second plate portion.

15. The saw of claim 14 wherein the second plate portion is positioned rearward of the first plate portion.

16. The saw of claim 1 further including a concrete saw blade mounted on the blade drive element.

17. A concrete saw comprising:
a motor and a first support element supporting the motor, and a blade drive element coupled to the motor and having means for accepting and supporting a concrete saw blade;
a second frame element wherein the second frame element includes a support for allowing the concrete saw to move along a surface;
a damping element between the blade drive element and the second frame element; and
wherein the motor includes a drive shaft and the blade drive element is spaced from and substantially parallel to the drive shaft.

18. The saw of claim 1 further including a drive belt between the motor and the blade drive element and a belt tension element fixed to the motor for pivoting.

19. A concrete saw comprising:
a saw blade on a blade drive shaft;
a motor;
a drive assembly linking the motor to the saw blade;
a support element supporting the drive assembly; and
a first damping element between the support element and the drive assembly wherein the drive assembly is supported on the support element only by one or more damping elements and a second damping element different from the first damping element supporting the blade drive shaft on the support element.

20. The saw of claim 19 further including at least one movable part for moving the saw blade and wherein the at least one movable part is on a side of the first damping element opposite the support element.

21. The saw of claim 19 wherein the first damping element is between the support element and each of the motor and drive assembly and the saw blade drive shaft.

22. The saw of claim 19 wherein the drive assembly includes a least one of a gear, sheave, belt, belt tension element and blade drive shaft.

23. The saw of claim 19 wherein the drive assembly includes each of a sheave, belt, belt tension element and blade drive shaft.

24. A concrete saw comprising:
a frame assembly having at least one wheel for supporting the saw for movement in a direction of cutting by a concrete saw blade on a concrete surface;

a concrete saw blade support element for supporting a concrete cutting blade for a cutting operation; and at least one damping element supporting the blade support element and extending between the frame assembly and the blade support element.

25. The saw of claim 24 wherein the support element is a blade shaft.

26. The saw of claim 25 further including a blade shaft housing supporting the blade support element.

27. The saw of claim 26 wherein the housing includes at least first and second support points and wherein the at least one damping element is a first damping element at the first support point and further including a second damping element at the second support point.

28. The saw of claim 25 further including a blade drive motor for driving the blade and wherein the blade shaft is supported by the motor.

29. The saw of claim 28 wherein the blade shaft is supported on a housing element and wherein the housing element is bolted to the motor.

30. The saw of claim 28 wherein the motor is supported on the frame assembly through motor mounting damping elements.

31. The saw of claim 30 wherein the motor mounting damping elements include first and second damping elements and wherein the first and second damping elements are spaced apart from each other.

32. The saw of claim 31 wherein the first and second damping elements are mounted to the frame assembly.

33. The saw of claim 24 wherein the support element is a rotating element.

34. The saw of claim 24 wherein the support element is an element driven by an engine.

35. The saw of claim 24 wherein the at least one damping element is a resilient element.

36. The saw of claim 35 wherein the resilient element is a resilient plastic element.

37. The saw of claim 24 further including an engine supported on the frame assembly.

38. The saw of claim 37 wherein the engine is supported on the frame assembly through resilient damping elements.

39. The saw of claim 37 wherein the concrete saw blade support element is a blade shaft supported on at least one bearing assembly and the at least one bearing assembly is fixed relative to the engine.

40. The saw of claim 39 wherein the at least one damping element supports the at least one bearing assembly.

41. The saw of claim 39 wherein the at least one bearing assembly is supported on the frame through two damping elements.

42. The saw of claim 41 wherein the two damping elements are spaced apart from each other.

43. The saw of claim 41 wherein the two damping elements are oriented to extend approximately perpendicular to the blade shaft.

44. A concrete saw comprising:
a frame assembly having a support surface for supporting the saw on a concrete surface;
a concrete saw blade support element for supporting a concrete cutting blade for a cutting operation;
at least one damping element supporting the blade support element and extending between the frame assembly and the blade support element;
an engine supported on the frame assembly;
wherein the concrete saw blade support element is a blade shaft supported on at least one bearing assembly, the at least one bearing assembly is fixed relative to the engine, and the at least one bearing assembly is supported on the frame through two damping elements; and
wherein the two damping elements are oriented on respective axes, wherein the engine is supported on the frame assembly through engine supports oriented in a first direction and the axes extend in a second direction different from the first direction.

45. A concrete saw comprising:
a frame assembly having a support surface for supporting the saw on a concrete surface;
a concrete saw blade support element for supporting a concrete cutting blade for a cutting operation;
at least one damping element supporting the blade support element and extending between the frame assembly and the blade support element;
an engine suiworted on the frame assembly;
wherein the concrete saw blade support element is a blade shaft supported on at least one bearing assembly and the at least one bearing assembly is fixed relative to the engine; and
wherein the at least one damping element is oriented in a first direction and the engine is supported through a second damping element oriented in a second direction different from the first direction.

46. A concrete saw comprising:
a frame assembly having a support surface for supporting the saw on a concrete surface;
a concrete saw blade support element for supporting a concrete cutting blade for a cutting operation;
at least one damping element supporting the blade support element and extending between the frame assembly and the blade support element;
an engine supported on the frame assembly;
wherein the concrete saw blade support element is a blade shaft supported on at least one bearing assembly and the at least one bearing assembly is fixed relative to the engine; and
wherein the frame assembly includes at least a first plate portion and a second plate portion oriented at an angle to the first plate portion, wherein the engine is supported through a damping element by the first plate portion and the at least one bearing assembly is supported through a damping element on the second plate portion.

47. A concrete saw comprising:
a first frame supported on wheels for movement in a direction of cutting on a surface and having a handle supported by the first frame;
a second frame supported for pivoting movement toward and away from the first frame;
a motor supported on the second frame;
at least one damping element extending between the motor and the second frame;
a blade drive shaft assembly supported on the second frame; and
at least a second damping element extending between the blade drive shaft assembly and the second frame.

48. The concrete saw of claim 47 wherein the at least one damping element is oriented on a first axis and the second damping element is oriented on a second axis extending in a direction different than the first axis.

49. The concrete saw of claim 47 wherein the second frame includes a first portion supporting the motor and a second portion extending at an angle to the first portion for supporting the blade drive shaft assembly.

* * * * *